United States Patent [19]

Billenstein et al.

[11] Patent Number: 4,515,723

[45] Date of Patent: May 7, 1985

[54] QUATERNARY N-ALKYL-N,N',N'-POLYOXYALKYL-α,ω-DIAMINO-ALKYLENE FATTY ACID ESTERS, AND THEIR USE

[75] Inventors: Siegfried Billenstein; Herbert Hartung, both of Burgkirchen; Adolf May, Hofheim am Taunus; Hans-Walter Bücking, Kelkheim, all of Fed. Rep. of Germany

[73] Assignee: Hoechst Aktiengesellschaft, Frankfurt, Fed. Rep. of Germany

[21] Appl. No.: 395,131

[22] Filed: Jul. 6, 1982

[30] Foreign Application Priority Data

Jul. 10, 1981 [DE] Fed. Rep. of Germany ....... 3127239

[51] Int. Cl.$^3$ .......................... C09F 5/00; C09F 7/00; C11C 3/00

[52] U.S. Cl. ................................ 260/404.5; 252/8.75

[58] Field of Search ..................... 260/404.5; 252/8.75

[56] References Cited

U.S. PATENT DOCUMENTS

| | | | |
|---|---|---|---|
| 2,596,985 | 5/1952 | Cook et al. | 260/404.5 EO X |
| 2,884,459 | 4/1959 | Kirkpatrick et al. | 260/404.5 EO X |
| 2,944,030 | 7/1960 | Patton | 260/404.5 EO X |
| 3,509,049 | 4/1970 | Zweidler | 252/8.75 |
| 3,983,061 | 9/1976 | Oxé et al. | 252/8.8 X |
| 4,126,562 | 11/1978 | Goffinet et al. | 252/8.75 X |
| 4,173,539 | 11/1979 | Rule et al. | 252/8.75 X |

OTHER PUBLICATIONS

Chemical Abstracts, 78, 31361h, (1973).

Chemical Abstracts, 83, 12116u, (1975).

*Primary Examiner*—Helen M. S. Sneed

*Attorney, Agent, or Firm*—Connolly and Hutz

[57] ABSTRACT

Quaternary N-alkyl-N,N'-,N'-polyoxyalkyl-α,ω-diamino-alkylene fatty acid esters of the formula (1)

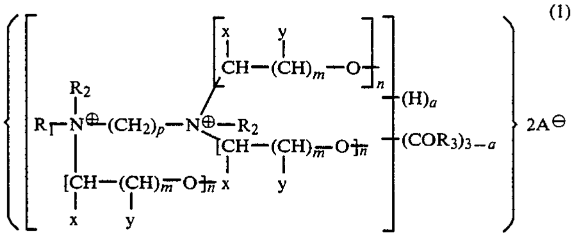

(1)

in which $R_1$ is $C_8$–$C_{30}$, preferably $C_{16}$–$C_{18}$-alkyl, or $C_8$–$C_{30}$, preferably $C_{16}$–$C_{18}$-alkenyl, $R_2$ is $C_1$–$C_4$-alkyl, preferably methyl, $R_3$ is $C_7$–$C_{29}$, preferably $C_{15}$–$C_{17}$-alkyl or $C_7$–$C_{29}$, preferably $C_{15}$–$C_{17}$-alkenyl, x and y each are hydrogen or methyl with the proviso that x and y are not simultaneously methyl, a is 0, 1 or 2, n is an integer of from 1 to 11, preferably 1, m is 1 or 2, p is an integer or from 1 to 5, preferably 3, and A is an anion, preferably a halogen, methosulfate or methophosphate ion.

These compounds are prepared by esterifying the basis oxalkylated alkylene diamines with fatty acids and subsequent quaternization. They are used as softeners.

3 Claims, No Drawings

QUATERNARY N-ALKYL-N,N',N'-POLYOXYALKYL-α,ω-DIAMINO-ALKYLENE FATTY ACID ESTERS, AND THEIR USE

Subject of the invention are quaternary N-alkyl-N,N',N'-polyoyalkyl-α, ω-diamino-alkylene fatty acid esters of the formula (1)

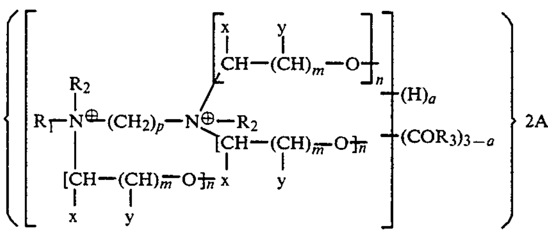

(1)

in which $R_1$ is $C_8$–$C_{30}$, preferably $C_{16}$–$C_{18}$-alkyl, or $C_8$–$C_{30}$, preferably $C_{16}$–$C_{18}$-alkenyl, $R_2$ is $C_1$–$C_4$-alkyl, preferably methyl, $R_3$ is $C_7$–$C_{29}$, preferably $C_{15}$–$C_{17}$-alkyl or $C_7$–$C_{29}$, preferably $C_{15}$–$C_{17}$-alkenyl x and y each are hydrogen or methyl with the proviso that x and y are not simultaneously methyl, a is 0, 1 or 2, n is an integer of from 1 to 11, preferably 1, m is 1 or 2, p is an integer of from 1 to 5, preferably 3, and A is an anion, preferably a halogen, methosulfate or methophosphate ion.

The compounds of the formula (1) are obtained by esterifying a compound of the formula (2)

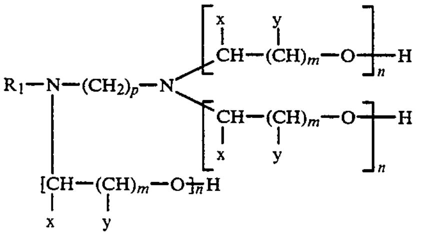

(2)

in which $R_1$, x, y, m, n and p are as defined above, with a fatty acid of the formula (3)

$$R_3\text{—}COOH \quad (3)$$

in which $R_3$ is as defined above, and quaternizing the reaction product obtained with an alkylating agent, with incorporation of the radical $R_2$.

The compounds of the formula (1) are prepared from the compounds of the formula (2) as starting products, which are obtained according to known methods by oxalkylation of fatty alkyl-alkylene diamines such as for example tallow fat propylene diamine (Schönfeldt, Surface active Ethylenoxide Adducts, 1969, p. 97). These compounds are esterified according to known methods with a fatty acid in high-boiling inert solvents such as toluene or xylene, or preferably without solvent in the melt and under a blanket of protective gas. When esterifying in a solvent, the reflux temperature of the reaction mixture is advantageously chosen as reaction temperature, and the water of reaction which forms is removed in an azeotropic mixture. When esterifying in substance, the water of reaction is distilled off directly from the reaction mixture. It is case, the reaction temperature is in a range of from 140° to 220° C., preferably 150° to 180° C. For accelerating the reaction, an acidic catalyst such as for example p-toluenesulfonic acid is used. By determining the acid number, the reaction is controlled with respect to its completion.

The molar ratio of fatty acid to compound of formula (2) is from 1 to 3, preferably 1 to 1.9, mols of fatty acid per mol of compound of formula (2). Depending on the molar ratio chosen, a mixture of fatty acid mono-, di- and triesters is obtained, preferably a mixture containing subsequently mono- and diesters.

The fatty acid ester mixture so obtained is then dissolved in an alcohol, or dispersed in water, and reacted with an alkylating agent at a temperature of below 100° C., preferably at 40° to 80° C., to yield the quaternary products of the invention. This reaction can be carried out also without any solvent. After having distilled off the water or the solvent, the compounds of the formula (1) are thus obtained. According to a preferred embodiment of the invention, the reaction mixture is adjusted after the alkylation to a pH of 6 to 7 by addition of alkali; and this solution is then directly used as softener, optionally after a corresponding dilution with water to the intended concentration, and corresponding making-up.

Preferred diamines being the basis of the starting compounds of the formula (2) are the commercial industrialgrade products tallow fat propylene diamine or stearylpropylene diamine. Alternatively, however, other diamines having a more or less broad alkyl chain distribution may be used in accordance with the invention. Such diamines are obtained in known manner by addition of acrylonitrile to primary fatty amines and subsequent catalytic hydrogenation of the propionnitriles.

Fatty acids suitable for esterification are natural or synthetic substances such as palmitic, stearic, benhenic acid, or branched compounds from the oxo synthesis such as isostearic acid, or mixtures of these acids such as they are obtained from natural fractions derived from coconut oil or tallow. As alkylating agent, methyl chloride or dimethyl sulfate is advantageously used.

The compounds of the formula (1) according to the invention are suitable as softeners and are added to the last rinsing bath after the washing of the textile material in the form of aqueous dispersions containing from 1 to 15, generally 4 to 10, weight % of a compound of the formula (1) as active substance. Subsequently, the textiles are dried. These softeners may contain in addition further substances and auxiliaries usually present in softeners, such as cationic or nonionic surface active substances, electrolytes, acidifiers, organic complexing agents, optical brighteners or solubilizers, and dyestuffs and perfumes. These products serve for additionally influencing the feel or other properties of the textiles to be treated, or for adjusting the viscosity or the pH, or for increasing the cold resistance of the solutions.

The compounds of the invention give a pleasant soft feel to any textiles, especially made from natural or regenerated cellulose, wool, cellulose acetate, triacetate, polyamide, polyacrylonitrile, polyesters, polypropylene. Especially advantageous is their use for after-treating terry cloth and underwear.

The following Example illustrates the invention.

EXAMPLE

1. Preparation of N-$C_{16}$–$C_{18}$-alkyl-N,N′,N′-tris-(2-hydroxyetyhl)-1,3-diaminopropane-di-stearic acid ester 467 g (1.0 mol) of N-$C_{16}$–$C_{18}$-alkyl-N,N′,N′-tris-(2-hydroxyethyl)-1,3-diaminopropane, 534 g (2.0 mols) of stearic acid and 0.2 g of ZnO are introduced into a 2 liter flask provided with stirrer, gas inlet and heating means, melted, and heated to 170° C. with stirring under a nitrogen blanket. After a 6 hours' reaction time, the acid number of 2.3 indicates termination of the esterification, so that the product can be introduced into the quaternization step.

In an analogous manner, the corresponding coconut fatty acid, oleic acid or tallow fatty acid derivatives can be prepared.

By a corresponding alteration of the stoichiometric ratio, mono- and triesters of N-$C_{16}$–$C_{18}$-alkyl-N,N′,N′-tris-(2-hydroxyethyl)-1.3-diaminopropane can be obtained in the same manner.

2. Quaternization of N-$C_{16}$–$C_{18}$-alkyl-N,N′,N′-tris-(2-hydroxyethyl)-1,3-diaminopropane-di-stearic acid ester with dimethyl sulfate 177 g of distearic acid ester prepared according to 1. is mixed in a flask with stirrer with 180 g of isopropanol, and heated to 40°–50° C. At this temperature, 48 g of dimethyl sulfate are added dropwise within about 30 minutes. After 3 hours, 12 g of sodium methylate sulution (35% strength in methanol), and 9 g of dimethyl sulfate are added, and the batch is stirred at about 50° C. for a further 2 hours. After addition of further 9 g of sodium methylate solution, by which the pH is adjusted to 6.6, and cooling at room temperature, the product can be used in softener formulations.

Quaternization of the mono- and tristearic acid esters with dimethyl sulfate in analogy to the above operation mode give the corresponding bis-quats.

What is claimed is:

1. Quaternary N-alkyl-N,N′,N′-polyoxyalkyl-α, ω-diamino-alkylene fatty acid esters of the formula (1)

(1)

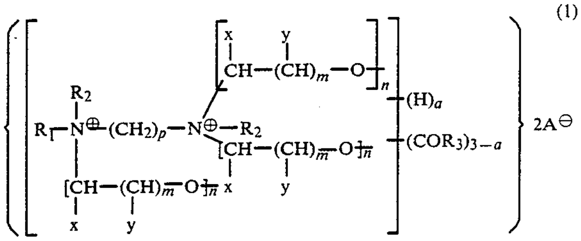

in which $R_1$ is $C_8$–$C_{30}$-alkyl, or $C_8$–$C_{30}$-alkenyl, $R_2$ is $C_1$–$C_4$-alkyl $R_3$ is $C_7$–$C_{29}$-alkyl or $C_7$–$C_{29}$-alkenyl, x and y each are hydrogen or methyl with the proviso that x and y are not simultaneously methyl, a is 0, 1 or 2, n is an integer of from 1 to 11, m is 1 or 2, p is an integer of from 1 to 5, and A is an anion.

2. Compounds of the formula (1) as claimed in claim 1, in which $R_1$ is $C_{16}$–$C_{18}$-alkyl or -alkenyl, $R_2$ is methyl, x and y each are hydrogen, N is 1, m is 1, p is 3 and A is a halide, methosulfate or methophosphate ion.

3. A textile softening composition containing a compound as claimed in claim 1.

* * * * *